United States Patent [19]

Eichhorn et al.

[11] Patent Number: 5,954,428
[45] Date of Patent: Sep. 21, 1999

[54] VEHICLE HEADLIGHT

[75] Inventors: Karsten Eichhorn, Ennigerloh; Roland Lachmayer, Bad Sassendorf; Christian Plattfaut; Holm Tietz, both of Lippstadt, all of Germany

[73] Assignee: Hella KG Hueck & Co., Lippstadt, Germany

[21] Appl. No.: 08/934,635

[22] Filed: Sep. 22, 1997

[30] Foreign Application Priority Data

Sep. 26, 1996 [DE] Germany .............................. 196 39 494

[51] Int. Cl.⁶ .................................................. B60Q 1/115
[52] U.S. Cl. .............................. 362/543; 362/464; 362/465
[58] Field of Search ..................................... 362/464, 465, 362/466, 467, 543, 544

[56] References Cited

U.S. PATENT DOCUMENTS

| | | | |
|---|---|---|---|
| 2,277,685 | 3/1942 | Bergstrom | 362/61 |
| 4,638,408 | 1/1987 | Wetherington | 362/544 |
| 4,833,573 | 5/1989 | Miyauchi et al. | 362/466 |
| 4,945,454 | 7/1990 | Bunse et al. | 362/61 |
| 5,353,203 | 10/1994 | Bertling et al. | 362/61 |

FOREIGN PATENT DOCUMENTS

| | | |
|---|---|---|
| 1278973 | 10/1968 | Germany . |
| 6602004 | 4/1969 | Germany . |
| 2637211C2 | 2/1978 | Germany . |
| 3533117C2 | 3/1987 | Germany . |
| 3704233A1 | 8/1988 | Germany . |
| 38 08 086 C2 | 3/1992 | Germany . |
| 4122531A1 | 1/1993 | Germany . |
| 4306316A1 | 9/1993 | Germany . |
| 19549077A1 | 7/1997 | Germany . |

*Primary Examiner*—Sandra O'Shea
*Assistant Examiner*—Todd Reed Hopper
*Attorney, Agent, or Firm*—Griffin, Butler, Whisenhunt & Szipl, LLP

[57] ABSTRACT

A vehicle headlight (1) has a reflector (2) that is divided vertically into an upper region (6), a middle region (7), and a lower region (8), wherein the upper region is structured as a low-beam light surface (9) having a first center (10), through which extends a longitudinal axis of a first lamp (3), the middle region is formed as a fog light surface (14) and the lower region as a high-beam light surface (15), and the fog light surface and the high-beam light surface have a common center (16) through which extends a longitudinal axis of a second lamp (4). The reflector is mounted so that it can pivot about its central axis, and is pivoted by an electric motor (5) as a function of lateral inclination of a vehicle on which the headlight is mounted.

16 Claims, 6 Drawing Sheets

VEHICLE HEADLIGHT

BACKGROUND OF THE INVENTION

This invention relates to a vehicle headlight of a type having a reflector that is divided vertically into an upper region, a middle region, and a lower region.

German patent document (DE 38 08 086), by way of example, discloses a vehicle headlight of this type. In that headlight, the division of the reflector into three regions is used for adapting a light distribution pattern in horizontal and vertical regions perpendicular to a central axis of the headlight, as closely as possible to a desired light distribution pattern. The disclosed vehicle headlight has a center common to the three regions, with a pass-through aperture for an incandescent lamp having a spiral-wound filament as a light source. Such vehicle headlights are used for low beam headlights, or for high beam headlights capable of adjustment to low beam. Such vehicle headlights cannot be used to generate additional fog light.

An independent fog light or an independent, separate, reflector with a corresponding lamp is commonly used to create fog light. However this additional headlight also requires additional space. For structural reasons, however, it may be desirable for low beam, high beam, and fog light units to fit into a small space.

It is an object of this invention to provide a multifunctional headlight for creating low-beam light, fog light, and high-beam light.

SUMMARY

According to the principles of this invention, an upper region of a headlight is a low-beam light surface having a first center through which a longitudinal axis of a first lamp extends, a middle region thereof is a fog light surface, and a lower region thereof is a high beam surface, with the fog light surface and the high beam surface having a common second center through which a longitudinal axis of a second lamp extends.

BRIEF DESCRIPTION OF THE DRAWINGS

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
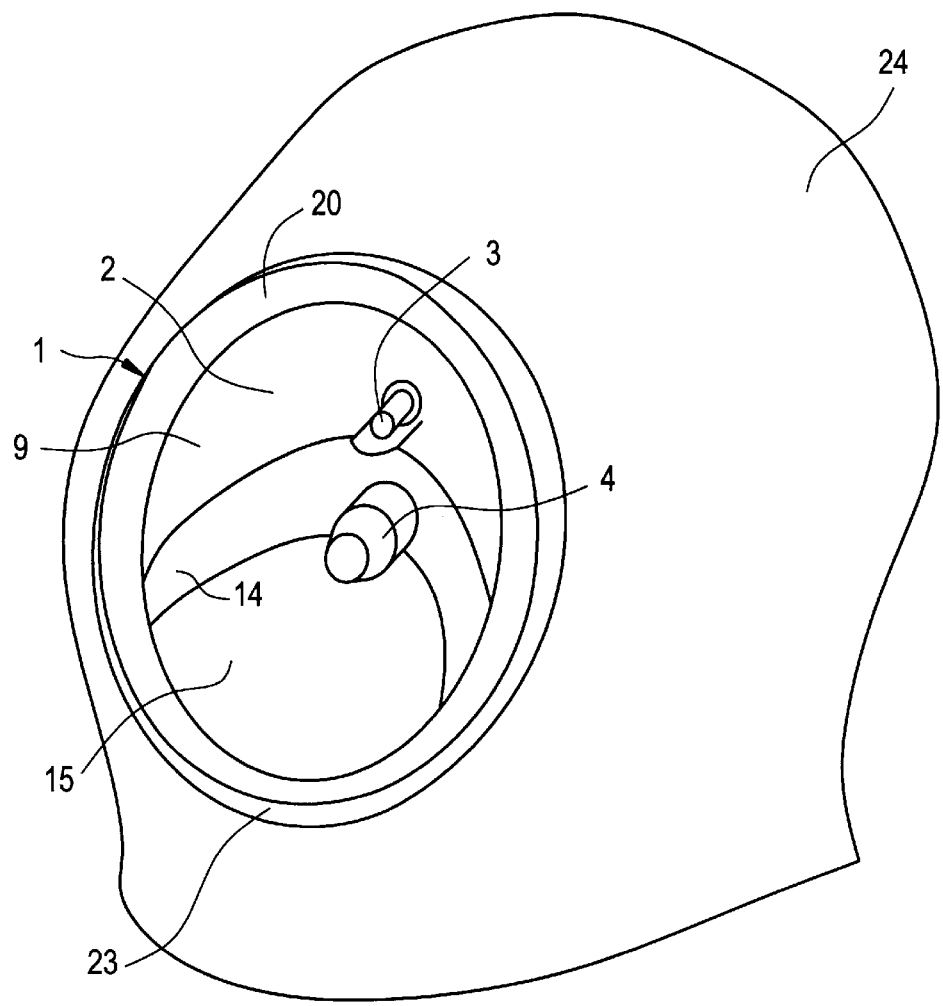
FIG. 1 is an isometric view of an installed headlight of this invention, including a vehicle body.

A vehicle headlight 1 comprises mainly a reflector 2, a first lamp 3, a second lamp 4, and an electric motor 5.

Figure 2:
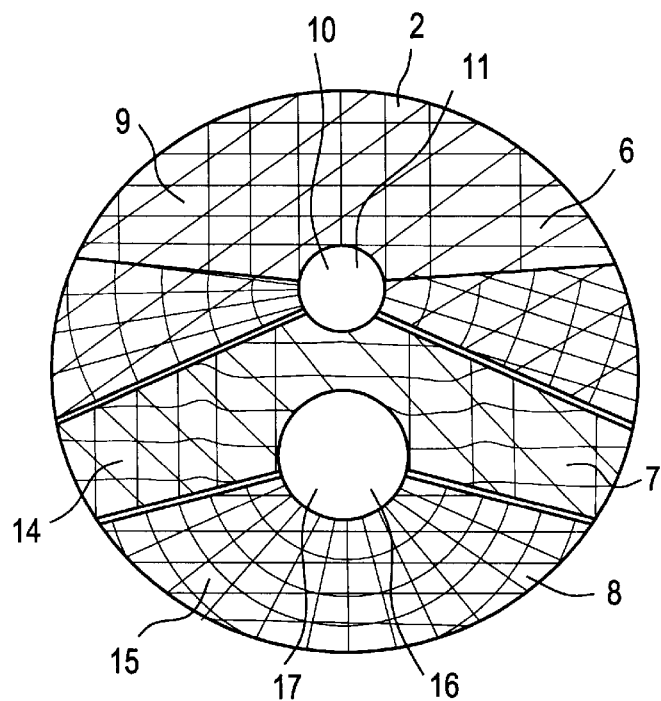
FIG. 2 is a simplified front view of a reflector of the headlight of FIG. 1.
Figure 3:
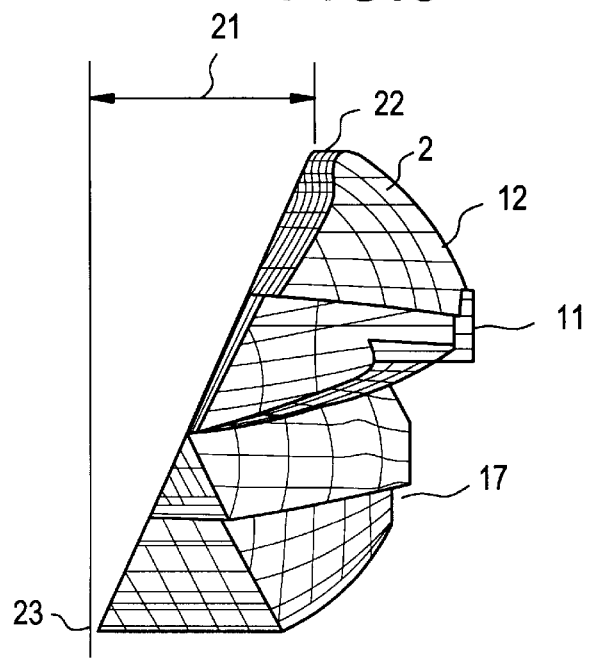
FIG. 3 is a simplified side view of the reflector of FIG. 2.
Figure 4:
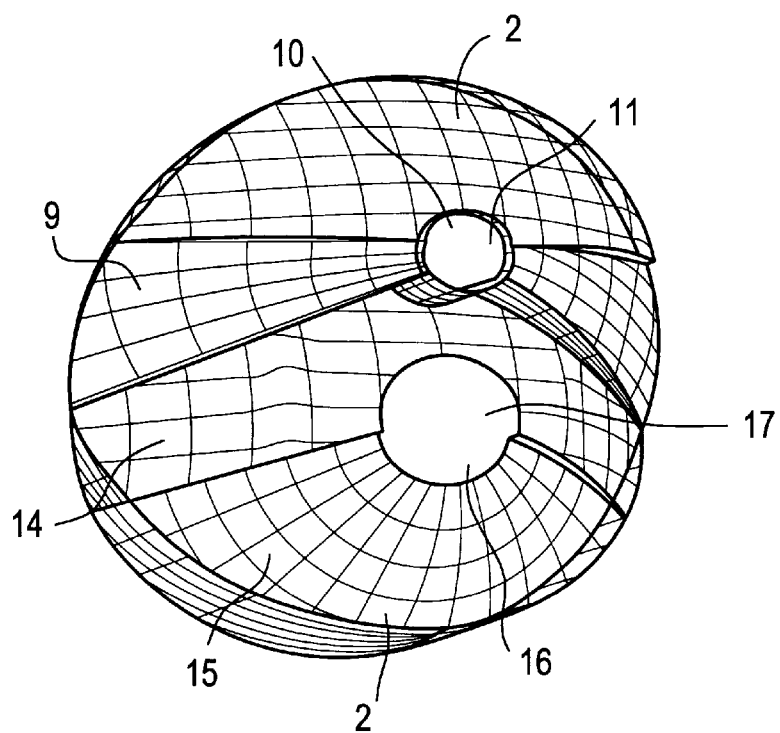
FIG. 4 is a simplified, three-dimensional representation of the reflector of FIG. 2.
Figure 9:
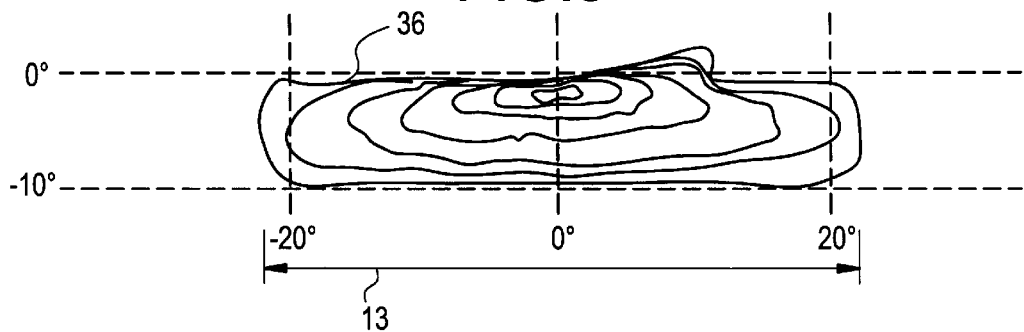
FIG. 9 is a graphic plot of a low-beam light distribution pattern of a headlight of this invention on a wall at a distance of 10 meters from the headlight.

As illustrated in FIG. 2, the reflector 2 is divided vertically into an upper region 6, a middle region 7, and a lower region 8. The upper region 6 is formed as a low-beam light surface 9. The low-beam light surface 9 has a first center 10 with a first pass-through opening 11. The first lamp 3 can be set into position from a rear 12 of the reflector 2 through the first pass-through opening 11. The low-beam light surface 9 is formed so that a low-beam light distribution pattern 36 as shown in FIG. 9 has a horizontal dispersion 13 of approximately ±20 to 25 degrees. Good and homogeneous illumination of a forward field is achieved through the relatively narrow dispersion 13. When used as a single central headlight, a maximum in the luminous intensity is determined and centrally placed. In the range of ±20 to 25 degrees, overlapping with a fog light distribution pattern is possible. By appropriate design of the low-beam light surface 9, however, an asymmetrical light distribution pattern may also be achieved.

Figure 10:
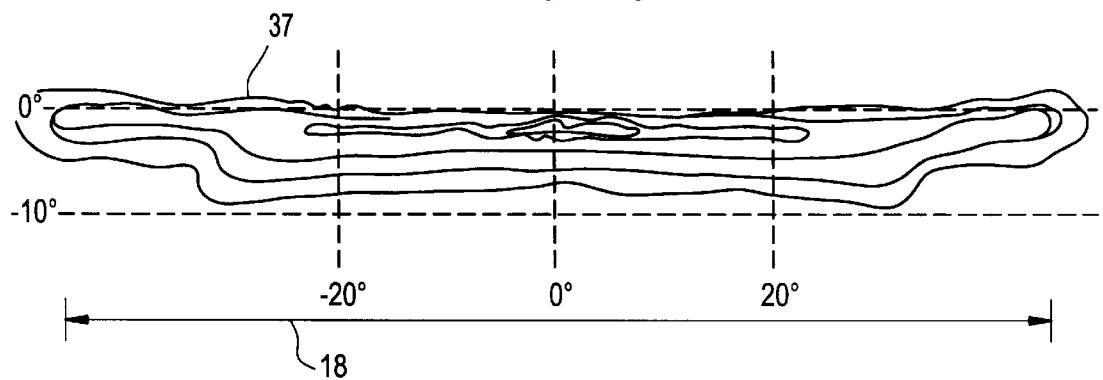
FIG. 10 is a graphic plot of a fog lamp light distribution pattern of a headlight of this invention on the 10-meter wall.
Figure 11:
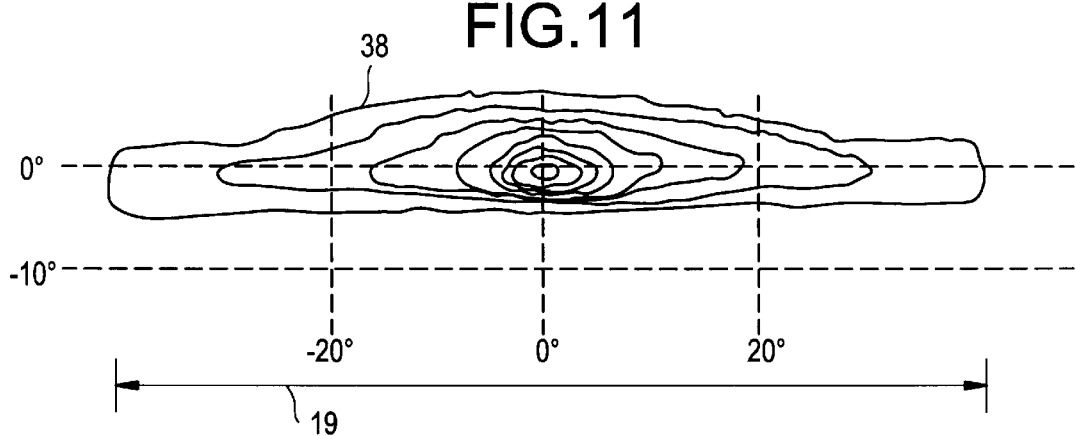
FIG. 11 is a graphic plot of a high-beam light distribution pattern of a headlight of this invention on the 10-meter wall.
Figure 12:
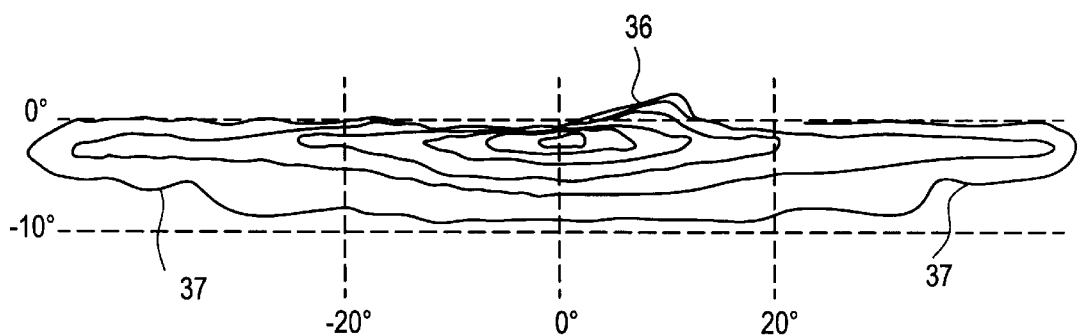
FIG. 12 is a graphic plot of a distribution pattern of low-beam light with fog lamp light superimposed thereon.
Figure 13:
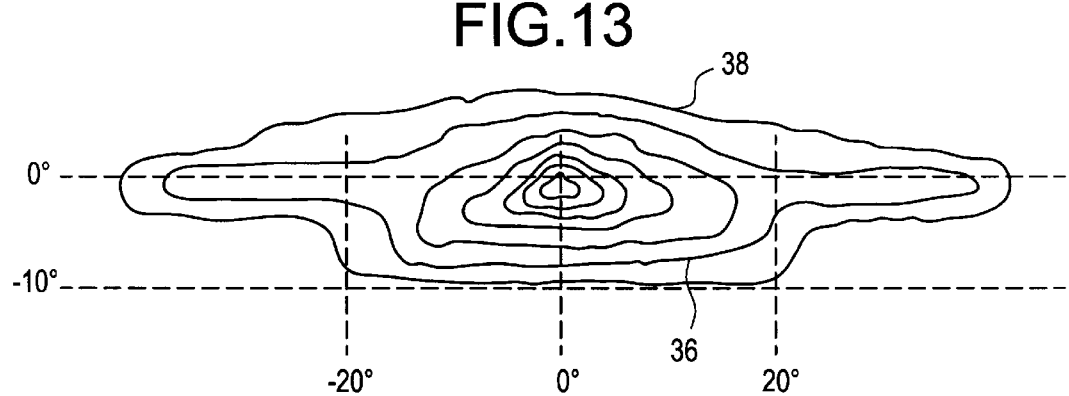
FIG. 13 is a graphic plot of a light distribution pattern of low-beam light with high beam light superimposed thereon.

The middle region 7 is formed as a fog light surface 14, and the lower region 8 is formed as a high beam surface 15. The fog light surface 14 and the high beam surface 15 have a second center 16 with a second pass-through opening 17. The second lamp 4 is placed into position from the rear 12 through the second pass-through opening 17 of the reflector 2. The fog light surface 14 is structured so that horizontal dispersion 18 of the fog light is approximately ±45 to 50 degrees, see FIG. 10. The fog light distribution pattern 37 can be superimposed onto the low-beam light, providing a combined light distribution pattern as illustrated in FIG. 12. Linkage, or overlapping, with the low-beam light distribution pattern 36 assures, in the range of ±20 to 25 degrees, approximately 4 lx. The high-beam light surface 15 is structured, or formed, so that a high-beam light distribution pattern 38 has a horizontal dispersion 19 of approximately ±35 to 45 degrees, see FIG. 11. The high-beam light has a central, narrow maximum in a range of approximately ±5 degrees. In coordination with the low beam light distribution pattern 36, the high-beam light distribution pattern 38 can also be used as superimposed high-beam light, with a combined light distribution pattern as illustrated in FIG. 13.

FIG. 1 shows a perspective view of the headlight 1. The first lamp 3 is structured as an Hi lamp with a low-beam light coil. The second lamp 4 is structured as an Ha lamp. It has a low-beam light coil, which is used as a fog light coil for generating the fog light distribution pattern 37. The second lamp 4 also has a high-beam light coil for generating high-beam light. The longitudinal axis of the first lamp 3 runs through the first center 10, or first pass-through opening 11, while the longitudinal axis of the second lamp 4 runs through the second center 16, or second pass-through opening 17.

The vehicle headlight 1, as well as the reflector 2, is substantially spherical, and is approximately 170 mm in diameter. Each of the lamps 3, 4 is placed approximately 25 mm vertically above and below a central axis of the vehicle headlight 1. The vehicle headlight 1 functions with an optics-free headlight lens 20. For the dimensions specified, the vehicle headlight allows for a built-in depth 21 of the reflector 2, i.e. Ea distance from a front edge 22 of the reflector to a front vehicle contour 23 of a body of a car 24, of 70 mm, without negatively influencing light and dispersion. Other dimensions are also generally possible in a correlative relationship.

Figure 5:
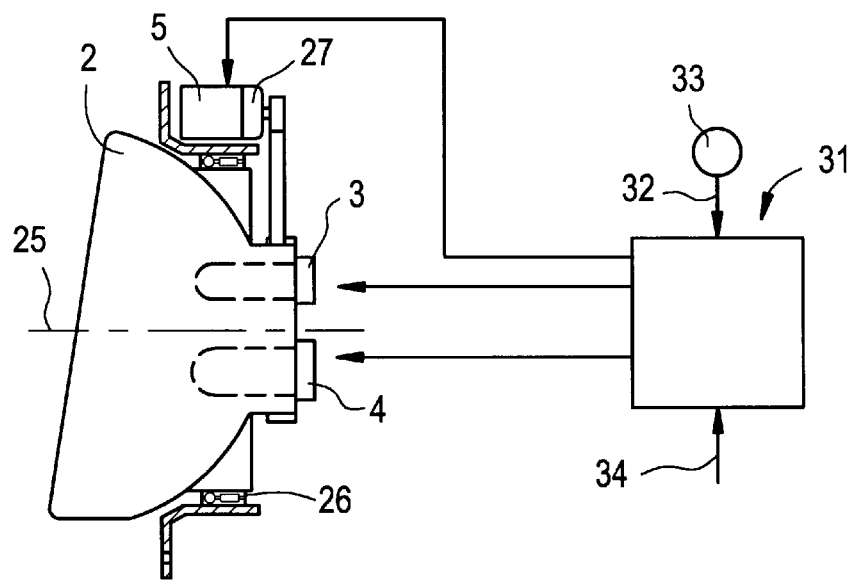
FIG. 5 is a simplified side view of a reflector with an electric motor for pivoting it, along with a schematic representation of an electronic drive and controls therefore.
Figure 6:
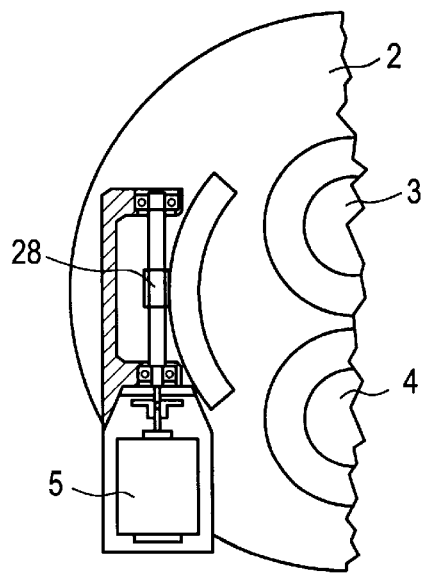
FIG. 6 is a rear view of a reflector with an electric motor and a worm gear for pivoting it.
Figure 7:
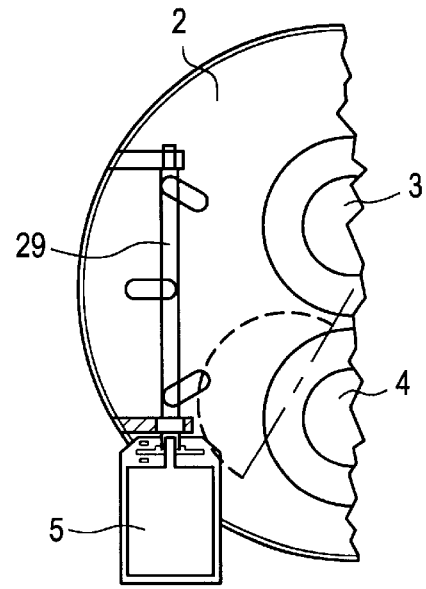
FIG. 7 is a rear view of a reflector with an electric motor and a threaded shaft for pivoting it.
Figure 8:
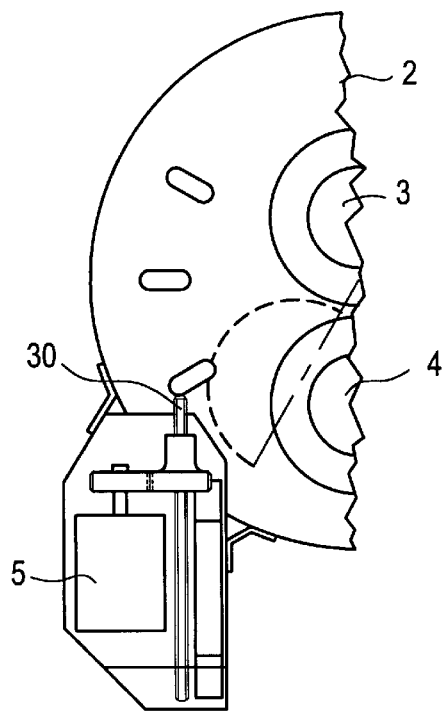
FIG. 8 is a rear view of a reflector with an electric motor and an translational-rod actuating drive for pivoting it.

As illustrated in FIG. 5, the reflector 2 is positioned on a bearing 26 so that it can be pivoted about its central axis 25. The electric motor 5 is connected to the reflector 2 via a set of gears 27, and pivots the reflector 2 as a function of a lateral inclination of a vehicle or the body of a vehicle 24. Connection between the reflector 2 and the electric motor 5 can be established by a worm gear mechanism 28, a threaded shaft 29, or an actuating drive with translational rod 30. The electric motor can be designed as a step motor, for example. An inclination sensor 33 is connected to a control device 31, which controls the electric motor 5 as a function of lateral inclination of the vehicle or of the vehicle body 24. The control device 31 is designed as a system based on a microcontroller, which links, or coordinates, signal inputs, such as a signal input 32 from the inclination sensor 33 or from a control signal 34 sent by a vehicle driver, using algorithms for combining the basic light distribution patterns 36, 37, 38. The reflector 2 is thus pivoted in such a way that it maintains its horizontal orientation and, despite the inclination of the vehicle, light distribution on the road remains unchanged. The reflector 2 is designed as a "free-surface" reflector, i.e. vertical or horizontal sections taken through the reflector 2 need not necessarily be parabolic or elliptical. The light surfaces 9, 14, 15 can be freely structured for generating the desired light distribution pattern.

It is also generally possible to mount known spherical vehicle headlights, or also vehicle headlights that are flattened along the vertical at tops and bottoms, so that they pivot about central axes and to pivot them as a function of lateral inclination of a vehicle.

Multifunctional utilization of the vehicle headlight of this invention, for low-beam light, fog light, and high-beam light, is made possible by arranging the different regions on the two centers, each having a separate lamp. By using a single reflector for the three basic functions of low-beam light, high-beam light, and fog light, a space requirement is relatively low. For example, the headlight can be used as one of a pair of headlights, e.g. for a passenger car, or as a central headlight for a two or three-wheel vehicle.

In a preferred embodiment of the invention, the first lamp is structured as an H7 lamp with a low beam coil for generating low-beam light distribution, and the second lamp is structured as an H4 lamp of a type known in the art, having a low beam coil and a high beam coil. The low beam coil of the H4 lamp is used for generating a fog light distribution pattern.

According to a further preferred embodiment of the invention, the vehicle headlight and the reflector are generally spherical and can be pivoted about the headlight's central optical axis. With this pivotal support the headlight or reflector can be pivoted as a function of inclination, in vehicles that exhibit lateral inclination of their bodies during cornering.

According to a further preferred embodiment of the invention, the reflector can be pivoted by an electric motor which is controlled by a control device connected to an inclination sensor so that, when the vehicle exhibits lateral inclination, the reflector maintains its horizontal orientation. This makes it possible to keep the light distribution pattern on the road unaltered regardless of any lateral inclination of the vehicle.

While the invention has been particularly shown and described with reference to a preferred embodiment, it will be understood by those skilled in the art that various changes in form and detail may be made therein without departing from the spirit and scope of the invention.

The invention claimed is:

1. A vehicle headlight having a reflector and first and second lamps, said reflector being divided vertically into an upper reflector region, a middle reflector region, and a lower reflector region, wherein the upper reflector region is structured as a low-beam light reflector surface that has a first center through which a longitudinal axis of the first lamp extends for producing a main part of a low-beam light distribution with the upper reflector region, and wherein the middle reflector region is structured as a fog light reflector surface and the lower reflector region is structured as a high-beam light reflector surface, and wherein the fog light reflector surface and the high-beam light reflector surface have a common second center, through which a longitudinal axis of the second lamp extends for producing a main part of a fog light distribution with the middle reflector region and a main part of a high-beam light distribution with the lower reflector region.

2. A vehicle headlight as in claim 1, wherein the low-beam light reflector surface is structured so that horizontal dispersion of a low-beam light distribution pattern is approximately ±20 to 25 degrees.

3. A vehicle headlight as in claim 1, wherein the fog light reflector surface is formed so that horizontal dispersion of a fog light distribution pattern is approximately ±45 to 50 degrees.

4. A vehicle headlight as in claim 1, wherein the high-beam light reflector surface is formed so that horizontal dispersion of a high-beam light distribution pattern is approximately ±35 to 45 degrees.

5. A vehicle headlight as in claim 4, wherein the high-beam light distribution pattern has a narrow maximum in a horizontal/vertical cross-section of approximately ±10 degrees.

6. A vehicle headlight as in claim 1, wherein the main part of the high-beam light distribution created by the high-beam light reflector surface can be superimposed onto the main part of the low-beam light distribution created by the low-beam light reflector surface.

7. A vehicle headlight as in claim 1, wherein the main part of the fog light distribution pattern created by the fog light reflector surface can be superimposed onto the main part of the low-beam light distribution pattern created by the low-beam light reflector surface.

8. A vehicle headlight as in claim 1, wherein the first lamp has a first low-beam light coil, and wherein the second lamp has a second low-beam light coil, for producing the fog light, as well as a high-beam light coil for producing the high-beam light.

9. A vehicle headlight as in claim 1, wherein the first lamp is an H7 lamp, and the second lamp is an H4 lamp.

10. A vehicle headlight as in claim 1, wherein the first lamp and the second lamp are approximately the same distance from a central axis of the vehicle headlight.

11. A vehicle headlight as in claim 1, wherein the reflector is generally spherical.

12. A vehicle headlight having a reflector and first and second lamps, said reflector being divided vertically into an upper reflector region, a middle reflector region, and a lower reflector region, wherein the upper reflector region is structured as a low-beam light reflector surface that has a first center through which a longitudinal axis of the first lamp extends, and wherein the middle reflector region is structured as a fog light reflector surface and the lower reflector region is structured as a high-beam light reflector surface, and wherein the fog light reflector surface and the high-beam light reflector surface have a common center, through which a longitudinal axis of the second lamp extends for producing a main part of a fog light distribution with the middle reflector region and a main part of a high-beam light distribution with the lower reflector region; wherein the reflector is mounted so that it pivots about its central axis.

13. A vehicle headlight as in claim 12, wherein is further included an electric motor connected to the reflector for pivoting the reflector.

14. A vehicle headlight as in claim 13, wherein the electric motor is connected to the reflector by a set of gears.

15. A vehicle headlight as in claim 12, wherein is included a means for pivoting the reflector as a function of lateral inclination of a vehicle on which the headlight is mounted.

16. A vehicle headlight as in claim 15, wherein is further included an electric motor and a control device connected to an inclination sensor for maintaining the reflector in a horizontal orientation when the vehicle exhibits lateral inclination.

* * * * *